United States Patent Office 3,296,096
Patented Jan. 3, 1967

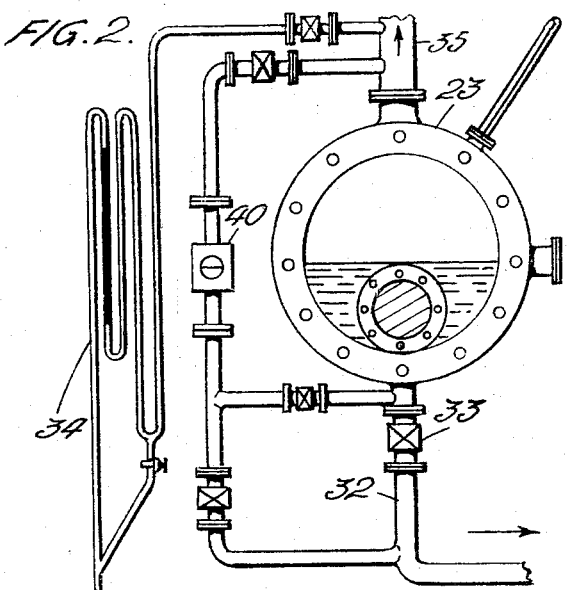

3,296,096
RECOVERY OF SULFUR TRIOXIDE BY DISTILLATION WHILE CONTROLLING A PROCESS VARIABLE IN RESPONSE TO THE DIELECTRIC CONSTANT
William Ewart Portman, Basil Tom Gillyatt, and Thomas Frederick Eden, Hollingwood, England, assignors to The Staveley Iron & Chemical Company Limited, Hollingwood, England, a British company
Filed Aug. 23, 1962, Ser. No. 219,002
Claims priority, application Great Britain, Aug. 24, 1961, 30,606/61
14 Claims. (Cl. 203—1)

This invention relates to the production of sulphur trioxide from sulphuric acid containing free sulphur trioxide. Sulphuric acid containing free sulphur trioxide is herein referred to as "oleum."

According to one aspect of the invention there is provided a process for the production of liquid sulphur trioxide from oleum, which process comprises separating the sulphur trioxide from the sulphuric acid by distillation and controlling the distillation in dependence upon the dielectric constant of the product or the liquor remaining during distillation.

According to another aspect of the invention there is provided a process for the production of liquid sulphur trioxide from oleum, which process comprises separating the sulphur trioxide from the sulphuric acid by distillation in at least two stages, and controlling the process in dependence upon the dielectric constant of the product of the second stage or the liquor remaining in the second stage.

Preferably the process is controlled by running off the remaining liquor from the distillation or second distillation stage. Preferably the dielectric constant is measured continuously, preferably by measuring the variations in the capacitance between two electrodes submerged in the product or the liquor.

The free sulphur trioxide content of the oleum constituting the starting material is between 5 and 65% by weight of the oleum. Preferably the sulphur trioxide content of the oleum is between 20% and 25% or between 58% and 65% by weight of the weight of the oleum. Although it is preferred that the starting material has from 60 to 65% by weight free sulphur trioxide it is often convenient to work with oleum comprising sulphuric acid containing from 20 to 22% by weight sulphur trioxide.

In the distillation of sulphur trioxide the temperature of the condenser is critical. Thus in the process of the present invention the temperature of the coolant, usually cooling water, may conveniently be between 25° C. and 37° C. but is preferably from 30 to 35° C. and more preferably from 30 to 32° C.

According to a further aspect of the invention there is provided apparatus for the production of liquid sulphur trioxide which apparatus comprises a still, a condenser and measuring means to measure the dielectric constant of the liquor in the still or of the condensate. Preferably the apparatus further comprises control means operable by the measuring means to control the operation of the apparatus. Preferably the control means is connected to run off the liquor in the still.

The apparatus may further comprise at least a second still and condenser so that the apparatus may carry out double distillation processes. In this case the measuring means is arranged to measure the dielectric constant of the liquor in or the condensate of the last condenser.

The measuring means may comprise a pair of preferably platinum electrodes which are arranged to be submerged in the said condensate and means to measure the capacitance between the plates.

An embodiment of the invention will now be described by way of example with reference to the accompanying drawings in which:

FIGURE 2 is an enlarged end view in the direction of arrow A in FIGURE 1 of the second still; and FIGURE 3 is a block diagram showing the means for measuring the capacitance between the capacitor electrodes.

Figure 1:
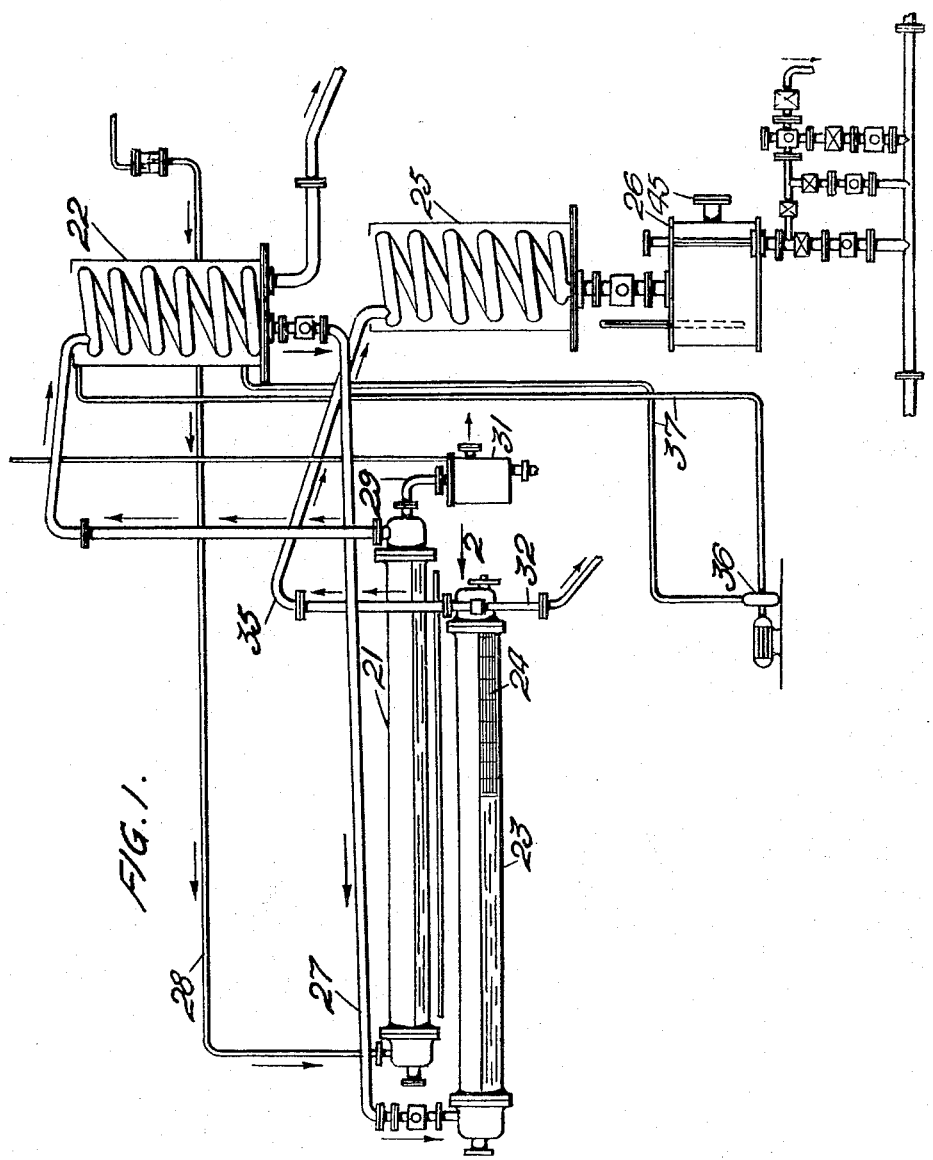
FIGURE 1 is a diagrammatic view of a plant for separating liquid sulphur trioxide from oleum comprising sulphuric acid containing from 20–22% free sulphur trioxide.

Referring now to FIGURE 1, the plant for separating liquid sulphur trioxide from oleum comprising sulphuric acid containing from 20–22% by weight of the weight of the oleum of free sulphur trioxide, comprises a first still 21 which is gas fired and which evaporates into its condenser 22, a second still 23 which is heated by a six element electrical heater contained in a mild steel sheath 24 and which evaporates into its condenser 25 and a sulphur trioxide receiver 26. The second still 23 is connected by pipe 27 to receive the condensate of the condenser 22 while the receiver 26 receives the condensate of condenser 25.

The first still 21 is fed by feed pipe 28 and is provided with a run-off pipe 29 for liquor which leads into a vented lute pot 31 (a vessel from which liquid can be withdrawn while maintaining a liquid seal against ingress of the atmosphere to the plant which it serves) connected to a waste. The second still 23 also has a liquor run-off pipe 32 which is controlled by relay operated valve 33 (see FIGURE 2) and which discharges into an appropriate waste receiver (not shown). A manometer 34 measures the vapour pressure in the sulphur trioxide off-take pipe 35 from the second still. A sight glass 40 measures the level of liquor in the second still 23.

The receiver 26 is connected through appropriate valves to a drum filling station.

The condensers 22 and 25 are water cooled. The coolant is circulated by an electrically operated pump 36 connected by pipes 37 to the first condenser 22 and similar other pipes (not shown) to the condenser 25.

All the pipes which are to pass sulphur trioxide are lagged and are electrically heated to about 30°–40° C. and preferably 35° C.

At the end of the second still 23 prior to the run-off pipe 32 is a mounting (not shown) which carries a device for measuring the sulphuric acid content of the liquor in the still 23. This device comprises a capacitor 39 having a pair of preferably platinum electrodes (not shown) which are so located that they are submerged in the liquor during operation of the plant. These platinum electrodes are calibrated so that their capacitance is known when the dielectric between them is liquid sulphur trioxide either free of sulphuric acid or containing a known amount of sulphuric acid. The capacitor 39 forms part of a variable frequency oscillator circuit 41 (see FIGURE 3). This circuit 41 also has an adjustable capacitor, the standard condenser 40 that is capable of being so adjusted that its capacitance is the same as the capacitance of the capacitor 39 and a tuning capacitor (not shown). The oscillator circuit 41 is connected to one set of plates of a cathode ray oscilloscope 42 and to a relay (not shown). A fixed frequency crystal oscillator 43 is connected to the other set of plates of the cathode ray oscilloscope 42 and to the relay.

The relay is connected to operate the valve 33.

In operation, a regular flowing stream of oleum comprising sulphuric acid containing 20% by weight of the oleum of free sulphur trioxide is passed to the first still 21 through feed pipe 28. The first still 21 is heated to 155–170° C. and the coolant water in the first condenser 22 (and also the second condenser 25) is at about 30°–32° C. The first still 21 is operated in such a fashion that the residue in the still 23 ultimately comprises liquid sulphur trioxide containing only a small proportion of sulphuric acid, e.g. the sulphur trioxide may comprise 80% but preferably 95% by weight of the weight of condensate. This condensate passes along lagged and heated pipe 27 to the second still 23. The liquor in the second still is heated to 44.5° C. and because of the small proportion of acid present in the feed it becomes progressively richer in sulphuric acid as distillation proceeds. This accumulation of acid in the liquor should never be allowed to exceed 20% before rejection. The condensate from the second condenser 25 is received in the receiver 26 where a stabilizer is added. This stabilizer may be in the form of between 0.1% and 2.0% and preferably 0.5%% carbon tetrachloride or .38% or .68% carbonyl halide. The stabilizer may however be added in the drums into which the liquid sulphur trioxide is filled or alternatively may be added in the second still 23.

If the sulphuric acid content of the liquor in the second still 23 should rise beyond the desired amount, the dielectric constant of the liquor will also rise. This is because the dielectric constant of sulphuric acid is greater than 100, more than thirty times as great as the dielectric constant of pure liquid sulphur trioxide which is about 3.1. This rise will be indicated on the cathode ray oscilloscope 42 and will also effect the relay to cause it to open the valve 33 which will allow the liquor to run off through pipe 32 until liquor contains an acceptable percentage of sulphuric acid.

The cathode ray oscilloscope 42 and relay may be set prior to the operation of the plant as follows:

The adjustable capacitor 40 is adjusted to a value which is identical with that which the capacitor 39 would give were it filled with pure liquid sulphur trioxide and the tuning capacitor is adjusted until the frequency of the variable frequency oscillator 41 matches that of the crystal oscillator 43, as shown on the oscilloscope. The cell is then switched into circuit when the presence of any acid in the sulphur trioxide flowing through it is revealed by a change in frequency. This change in frequency leads to corrective changes in the setting of the relay valve 33 until the frequencies return to the null position. If desired it can also be measured by resetting the tuning condenser of the variable frequency oscillator. The extent of the required alteration to the setting of the tuning condenser is directly related to the concentration of the sample under examination and when used analytically on the plant distillate, it has proved possible to measure changes as small as 100 p.p.m. sulphuric acid.

The process hereinbefore described produces continuously liquid sulphur trioxide of a very low acid content which is under 500 p.p.m. This is important as a satisfactory quality of liquid sulphur trioxide must contain a minimum quantity of sulphuric acid because even traces of this sulphuric acid promotes the formation of a solid and intractable polymer of the trioxide. Furthermore the process has substantial advantages over processes used hitherto in which it has been the custom to control such processes by withdrawing samples of distillate and testing these for resistance to polymerisation by prolonged freeze melt tests.

The various parts of the apparatus are preferably made from cast iron or mild steel. The gaskets in the piper are preferably made of asbestos while the gaskets in the stills may be made of asbestors or polytetrafluoroethylene.

Means, not shown, are provided for adding auxiliary steam or cold water to the coolant in condenser 22 to vary the temperature of the coolant. This steam or cold water may be added to the inlet to the pump 36.

The process and apparatus may be subject to a number of modifications. For example, the measuring device 39, or a second measuring device, may be carried on a mounting 45 on the sulphur trioxide receiver 26 with its electrodes submerged in the liquid sulphur trioxide. Further the relay or one of the relays may monitor the condensate flow into the second still 23 may alternatively or in addition monitor such variables as input of oleum to the plant or the heat supplied to the first or second still. Further the cathode ray oscilloscope 42 may be omitted and/or other apparatus of measuring the capacity changes e.g. meters and/or audible signalling devices may be used. An emergency run-off may lead from the first and/or second condenser to the outside. Yet again the capacitance changes may be measured intermittently e.g. every hour, day, week etc. This measurement may be made on samples drawn from the apparatus.

Further, the manometer 34 may be omitted or may be replaced by another pressure measuring device.

We claim:

1. A process for the production of liquid sulphur trioxide from oleum, which process comprises feeding oleum to a distillation zone, heating said oleum in said distillation zone, removing oleum residue from said distillation zone and collecting a distillate containing a high proportion of sulphur trioxide, measuring the dielectric constant of a material selected from the group consisting of the oleum in said distillation zone and the oleum in said distillate and adjusting at least one process variables selected from the group consisting of the oleum feed flow rate, the rate of removal of said oleum residue from said distillation zone and the amount of heat supplied to said distillation zone in response to said measurement of said dielectric constant such that the proportion of acid in said oleum in said distillation zone is prevented from rising above a predetermined level.

2. The process of claim 1 conducted continuously.

3. A process as claimed in claim 1 wherein the dielectric constant is measured by measuring the variations in the capacitance between two electrodes submerged in the said material.

4. A process as claimed in claim 1 wherein the free sulphur trioxide content of the oleum constituting the starting material is between 5 and 65% by weight of the weight of the oleum.

5. A process as claimed in claim 1 wherein the distillate is condensed in a condenser in which the temperature of the cooling liquid is between 28° C. and 37° C.

6. A process as claimed in claim 5 wherein the temperature of the cooling liquid is between 28° C. and 35 °C.

7. A process as claimed in claim 2 wherein the temperature of the cooling liquid is between 30° and 32° C.

8. A process for the production of liquid sulphur trioxide from oleum, which process comprises feeding oleum to a first distillation zone, heating said oleum in said first distillation zone, removing oleum residue from said first distillation zone, collecting a first distillate containing a high proportion of sulphur trioxide, feeding said first distillate to a second distillation zone, heating said first distillate in said second distillation zone, removing oleum residue from said second distillation zone, collecting a second distillate consisting essentially of liquid sulphur trioxide, measuring the dielectric constant of one or more materials selected from the group consisting of the liquids in said first and second distillation zones, said first and said second distillates and adjusting at least one process variables selected from the group consisting of the flow rate of the oleum feed to said first distillation zone, the flow rate of the first distillate feed to said second distillation zone, the rate of removal of the residue from said first distillation zone, the rate of removal of the residue from said second distillation zone, the amount of heat supplied to said first distillation zone and the amount of heat supplied to said second distillation zone such that the proportions of acid in said distillation zones are prevented from rising above predetermined values.

9. The process of claim 8 conducted continuously.

10. A process as claimed in claim 8 wherein the dielectric constant is measured by measuring the variations in the capacitance between two electrodes submerged in the said material.

11. A process as claimed in claim 8 wherein the free sulphur trioxide content of the oleum constituting the starting material is between 5 and 65% by weight of the oleum.

12. A process as claimed in claim 8 wherein the distillates are condensed in a condenser in which the temperature of the cooling liquid is between 28° and 37° C.

13. A process as claimed in claim 12 wherein the temperature of the cooling liquid is between 28° C. and 35° C.

14. A process as claimed in claim 12 wherein the temperature of the cooling liquid is between 30° C. and 32° C.

References Cited by the Examiner
UNITED STATES PATENTS

| | | | |
|---|---|---|---|
| 2,407,822 | 9/1946 | Fahnestock et al. | 23—174 |
| 2,415,159 | 2/1947 | Bradley et al. | 23—174 |
| 2,783,420 | 2/1957 | Thompson et al. | 196—132 |
| 2,856,266 | 10/1958 | Beau et al. | 23—174 |
| 2,903,417 | 9/1959 | Beaugh et al. | 196—132 |
| 2,905,616 | 9/1959 | Moore et al. | 196—141 |
| 2,931,433 | 4/1960 | Mertz | 159—47 |
| 3,156,628 | 11/1964 | Larrison | 202—160 |
| 3,212,997 | 10/1965 | Walker | 202—160 |

FOREIGN PATENTS

| | | |
|---|---|---|
| 540,042 | 8/1955 | Belgium. |

NORMAN YUDKOFF, *Primary Examiner.*

WILBUR BASCOMB, *Examiner.*